US012744160B2

(12) United States Patent
Six et al.

(10) Patent No.: US 12,744,160 B2
(45) Date of Patent: Sep. 22, 2026

(54) PROCESS OF MANUFACTURING A DIELECTRIC FOR A CAPACITOR AND PROCESS OF MANUFACTURING A CAPACITOR AND CAPACITOR

(71) Applicants: TDK Electronics AG, Munich (DE); Polymer Competence Center Leoben GmbH, Leoben (AT)

(72) Inventors: Birgit Six, St. Josef (AT); Stefan Sax, Graz (AT); Frank Wiesbrock, Sankt Michael in Obersteiermark (AT); Stefan Hirner, Graz (AT); Lukas Heupl, Scharnstein (AT)

(73) Assignees: TDK Electronics AG, Munich (DE); Polymer Competence Center Leoben GmbH, Leoben (AT)

( * ) Notice: Subject to any disclaimer, the term of this patent is extended or adjusted under 35 U.S.C. 154(b) by 38 days.

(21) Appl. No.: 18/684,299

(22) PCT Filed: Sep. 22, 2022

(86) PCT No.: PCT/EP2022/076388
§ 371 (c)(1),
(2) Date: Feb. 16, 2024

(87) PCT Pub. No.: WO2023/052235
PCT Pub. Date: Apr. 6, 2023

(65) Prior Publication Data

US 2024/0428993 A1 Dec. 26, 2024

(30) Foreign Application Priority Data

Sep. 30, 2021 (DE) ........................ 102021125407.8

(51) Int. Cl.
*H01G 4/18* (2006.01)
*H01G 4/30* (2006.01)
*H01G 4/32* (2006.01)

(52) U.S. Cl.
CPC ................. *H01G 4/18* (2013.01); *H01G 4/30* (2013.01); *H01G 4/32* (2013.01)

(58) Field of Classification Search
CPC ............... H01G 4/18; H01G 4/30; H01G 4/32
See application file for complete search history.

(56) References Cited

U.S. PATENT DOCUMENTS 3,649,892 A 3/1972 Booe
3,783,480 A 1/1974 Booe
(Continued)

FOREIGN PATENT DOCUMENTS

CN 1366685 A 8/2002
DE 3143995 C2 8/1992
(Continued)

OTHER PUBLICATIONS

Examination Report in related German Patent Application No. 10 2021 125 407.8, dated Jul. 31, 2025, in German (7 pages).
(Continued)

*Primary Examiner* — Michael P Mcfadden
(74) *Attorney, Agent, or Firm* — Nixon Peabody LLP

(57) ABSTRACT

The application relates to the process for producing a dielectric for a capacitor, the process for producing a capacitor and a capacitor. The process comprises the production of polymer chains from monomers by polymerization. In this process, some repeating units in the polymer chain are functionalized with reactive groups. The reactive groups branch off from the respective polymer chains. Furthermore, the reactive groups are suitable for reacting with a linker molecule. The reactive groups are therefore suitable for
(Continued)

forming a covalent bond with a linker molecule. As a further process step, linker molecules are added to the polymer chains, each linker molecule having at least two chemical linking points, each of which is suitable for forming a covalent bond with a reactive group. Finally, crosslinking of the polymer chains is achieved by reactions of the linker molecules with two reactive groups.

10 Claims, 10 Drawing Sheets

(56) References Cited

U.S. PATENT DOCUMENTS

| | | | | |
|---|---|---|---|---|
| 4,515,931 | A | 5/1985 | Olson | |
| 4,555,745 | A | 11/1985 | Westermeier et al. | |
| 4,586,111 | A | 4/1986 | Cichanowski | |
| 4,842,893 | A | 6/1989 | Yializis | |
| 5,125,138 | A | 6/1992 | Shaw | |
| 6,425,861 | B1 | 7/2002 | Munshi | |
| 6,974,620 | B1 | 12/2005 | Tsunekawa | |
| 8,354,166 | B2 | 1/2013 | Tan | |
| 9,105,408 | B2 | 8/2015 | Ichikawa | |
| 9,416,216 | B2 | 8/2016 | Hioki | |
| 9,443,655 | B2 | 9/2016 | Ichikawa | |
| 10,077,345 | B2 | 9/2018 | Odle | |
| 2002/0012849 | A1* | 1/2002 | Miura | H01B 1/122 429/313 |
| 2003/0171532 | A1* | 9/2003 | Cui | B01D 71/68 528/373 |
| 2005/0249975 | A1 | 11/2005 | Sandberg et al. | |
| 2006/0202198 | A1 | 9/2006 | Halik | |
| 2007/0040145 | A1* | 2/2007 | Muramoto | H01M 10/0565 521/27 |
| 2007/0104878 | A1 | 5/2007 | Kodas | |
| 2007/0232734 | A1 | 10/2007 | Kanakarajan | |
| 2007/0258190 | A1 | 11/2007 | Irwin | |
| 2010/0244585 | A1 | 9/2010 | Tan | |
| 2010/0259865 | A1 | 10/2010 | Tan | |
| 2011/0110015 | A1 | 5/2011 | Zhang | |
| 2011/0266534 | A1* | 11/2011 | Yan | C08F 220/10 257/E51.027 |
| 2011/0267739 | A1 | 11/2011 | Yeager | |
| 2012/0056183 | A1 | 3/2012 | Mueller | |
| 2012/0287555 | A1 | 11/2012 | Silvi | |
| 2014/0226256 | A1 | 8/2014 | Ichikawa | |
| 2015/0235767 | A1 | 8/2015 | Aotani | |
| 2015/0364688 | A1* | 12/2015 | Shukla | C08G 18/83 522/153 |
| 2016/0319150 | A1 | 11/2016 | Shepherd et al. | |
| 2018/0033554 | A1 | 2/2018 | Li | |
| 2018/0061582 | A1 | 3/2018 | Furuta | |
| 2019/0157558 | A1* | 5/2019 | Rhodes | H10K 85/654 |
| 2019/0189347 | A1* | 6/2019 | Edder | C08G 69/32 |
| 2022/0406526 | A1* | 12/2022 | Six | H01G 4/30 |

FOREIGN PATENT DOCUMENTS

| | | | |
|---|---|---|---|
| DE | 10340609 | A1 | 4/2005 |
| DE | 112011102917 | T5 | 9/2013 |
| JP | S59-135748 | A | 8/1984 |
| JP | 2663610 | B2 | 10/1997 |
| JP | H10-139865 | A | 5/1998 |
| JP | 2003502856 | A | 1/2003 |
| JP | 2003238761 | A | 8/2003 |
| JP | 2003268189 | A | 9/2003 |
| JP | 2004111774 | A | 4/2004 |
| JP | 2007531265 | A | 11/2007 |
| JP | 2013040284 | A | 2/2013 |
| JP | 5357749 | B2 | 12/2013 |
| JP | 2015189972 | A | 11/2015 |
| WO | WO 98/27562 | A1 | 6/1998 |
| WO | WO 2013085467 | A1 | 6/2013 |
| WO | WO 2016/126291 | A1 | 8/2016 |
| WO | WO 2018/237377 | A1 | 12/2018 |

OTHER PUBLICATIONS

Examination Report in related German Patent Application No. 102021125407.8, in German, dated Oct. 22, 2024 (7 pages).

International Search Report, with English translation, and Written Opinion of International Searching Authority corresponding to International Patent Application No. PCT/EP2022/076388, mailed Jan. 2, 2023 (12 pages).

Wentao Xu et al.; "Hysteresis-free organic field-effect transistors with high dielectric strength cross-linked polyacrylate copolymer as a guide insulator"; Organic Electronics, vol. 11, No. 5, pp. 836-845; Elsevier, Amsterdam, Netherlands; May 1, 2010; ISSN: 1566-1199; XP026999934 (10 pages).

AVX; "F9H Series: High Temperature 150° C., Improved Reliability J-Lead"; publication date unknown (3 pages).

AVX; "High Temperature MLCCs: AT Series—200° C. & 250° C. Rated"; publication date unknown (6 pages).

AVX; "THJ Series: High Temperature Tantalum Chip Capacitor"; publication date unknown (6 pages).

CDE Cornell Dubilier; "Type CD16 & CDV16 Snubber and RF Application, Mica Capacitors: Higher dV/dt Capability and Flatter Insertion Loss"; publication date unknown (4 pages).

CDE Cornell Dubilier; "Types MCM and MIN—SMT Clad RF Capacitors: Multilayer High Power, High Temperature Mica and PTFE Capacitors"; publication date unknown (7 pages).

KEMET Electronics Corporation; "KEMET Organic Capacitor (KO-CAP)—Automotive Grade: T591, T598, T597, and T599 High Humidity and High Temperature Automotive Grade Polymer Electrolytic, 2.5-50 VDC"; Mar. 6, 2020 (24 pages).

KEMET Electronics Corporation; "Metallized Polyphenylene Sulfide, Stable +150° C. High Temperature Capacitor: SMR, 5.0-27.5 mm Lead Spacing, 50-400 VDC"; Mar. 6, 2019 (27 pages).

KEMET Electronics Corporation; "Tantalum Surface Mount Capacitors—Automotive Grade: T498 Automotive Grade $MnO_2$ 150° C."; Dec. 13, 2019 (18 pages).

Wagner, C., Brückner Maschinebau; "Polyolefin Blends—A new film for high temperature film capacitors"; publication date unknown (3 pages).

Panasonic; "Plastic Film Capacitors: Stacked Metallized PEN Film Chip Capacitor"; Jul. 2011 (13 pages).

Panasonic; "Plastic Film Capacitors: Stacked Metallized PPS Film Chip Capacitor"; Feb. 1, 2016 (2 pages).

Examination Report in related Japanese Patent Application No. 2024-509065, dated Jun. 24, 2025, in Japanese (4 pages).

* cited by examiner

PROCESS OF MANUFACTURING A DIELECTRIC FOR A CAPACITOR AND PROCESS OF MANUFACTURING A CAPACITOR AND CAPACITOR

CROSS-REFERENCE TO RELATED APPLICATIONS

This application is a U.S. National Stage of International Application No. PCT/EP2022/076388, filed Sep. 22, 2022, which claims the benefit of Germany Patent Application No. 102021125407.8, filed Sep. 30, 2021, both of which are incorporated herein by reference in their entireties.

FIELD

The invention relates to the process of manufacturing a dielectric for a capacitor, the process of manufacturing a capacitor and a capacitor.

BACKGROUND

Polymer dielectrics or polymer-containing dielectrics are used in a wide range of power electronic applications, especially in passive components such as electrical capacitors. Due to increasingly demanding operating environments, e.g. due to ever higher integration densities in applications, polymers are required for application temperatures of 150° C. or higher. In addition, dielectric properties need to be continuously improved, but also precisely adjustable to meet specific technical requirements.

In the field of organic field-effect transistors, a polyacrylate-containing copolymer was proposed for the insulator of the gate electrode (gate insulator) in the non-patent literature 1 listed below. Among other things, it is disclosed here that the material can be cross-linked by means of reactive side groups which directly bridges one polymer main chain with another. An advantageous dielectric strength was reported.

Non-Patent Literature 1

Wentao Xu, Shi-Woo Rhee, Hysteresis-free organic field-effect transistors with high dielectric strength cross-linked polyacrylate copolymer as a gate insulator, Organic Electronics, Volume 11, Issue 5, 2010, Pages 836-845, ISSN 1566-1199.

SUMMARY

The present invention can at least partially solve the problems outlined above. In particular, a flexibly adaptable system can be achieved. In particular, the problems can be at least partially solved by the subject matter of claim 1. Further objects or preferred embodiments can be found in the further claims.

According to a first aspect, a method for producing a dielectric for a capacitor is disclosed. This method comprises providing polymer chains having reactive groups branching off from the respective polymer chain. The reactive groups are suitable for forming a covalent bond with a linker molecule. As a further process step, linker molecules are added to the polymer chains, each linker molecule having at least two chemical linking points, each of which is suitable for forming a covalent bond with a reactive group. Finally, crosslinking is carried out between the polymer chains or in a polymer chain by reaction or covalent bonding of a linker molecule with two reactive groups.

According to the process, it is preferred that the provision of polymer chains is the first process step. Subsequently, it is preferred that the linker molecule is added. It is further preferred that the crosslinking is carried out after the two steps described above.

Polymer chains can be understood here and in the following as polymer main chains of a polymer material. As emphasized by the term "polymer main chain", polymer chains are preferably structurally different from crosslinkings within a polymer chain or between polymer chains as well as from branching. Polymer chains are preferably significantly longer than such structures. Polymer chains as such generally have repeating units. The polymer chains are preferably formed from monomers by polymerization. The monomers are preferably organic molecules. This can be part of the step of providing polymer chains. The monomers are preferably molecules and even more preferably organic molecules. After polymerization, the structural unit within the polymer chains resulting from the monomers may be referred to as the repeating unit. However, it should be noted that the term repeating unit does not imply that a periodicity must be present in the polymer chains. Particularly in the case of copolymers or terpolymers, which are formed from different monomers, there is often no periodicity. The order or arrangement of the repeating units in relation to each other within a polymer chain is generally not limited. Preferably, this follows a normal distribution. This can be obtained, for example, if a mixture of monomers is polymerized together, which can be technically uncomplicated and therefore preferred. It should also be noted that the term repeating unit does not exclude periodicity either locally or over the entire polymer chains. For example, homopolymers have periodicity. Block copolymers or block terpolymers can also be used. These can exhibit periodicity within a block, for example.

The reactive groups are preferably each arranged on a repeating unit. One or more reactive group(s) can, for example, be covalently attached to the repeating unit as functional group(s). It is therefore possible to speak of repeating units with a reactive group.

The crosslinked material with or made of crosslinked polymer chains can be referred to as crosslinked polymer or crosslinked polymer material.

The polymer chains can have branches. In particular, the reactive groups branching off from the polymer main chain represent the preferred type of branching. It is further preferred that the groups branching off as branches are short compared to the polymer chains. The branching groups preferably have 100 atoms or less and even more preferably have 20 atoms or less.

Up to a small proportion of cross-connections can already exist between polymer chains or within polymer chains before crosslinking, which can be created, for example, by the original polymerization reaction. However, such a degree of crosslinking is preferably lower than crosslinking via reactive groups and linker molecules. Preferably, the proportion of polymer chains which already have crosslinks prior to crosslinking is such that the polymer chains remain soluble in a solvent, which is preferably an organic solvent, prior to crosslinking. Preferably, the proportion of such links between polymer chains is, for example, less than or equal to 1% relative to the number of repeating units of the polymer chain. This can facilitate solubility.

A reactive group is understood as a functional group on the polymer chain that is capable of forming a covalent bond via a chemical reaction with a linking point of the linker molecule.

In principle, at least two reactive groups can react with a linker molecule during crosslinking. In this way, two polymer chains can be covalently connected or linked to each other. Similarly, regions of a single chain can also be linked together. The latter is particularly common in the case of long and, for example, folded polymer chains. During crosslinking, it is preferred that multiple covalent bonds are formed. In particular, it is preferred that a plurality of reactions take place during crosslinking, in each of which a linker molecule with at least two reactive groups forms a covalent bond.

According to the process described above, it is preferred that at least some repeating units in the polymer chains are functionalized with reactive groups. The functionalization can be carried out on the monomers, i.e. before polymerization, or on the repeating units in the polymer chains, i.e. after polymerization. In principle, all repeating units of the polymer chains can also be functionalized with a reactive group. In some cases, copolymers or terpolymers are preferred in which there is also a proportion of repeating units not functionalized with a reactive group in addition to the repeating units functionalized with a reactive group. The "repeating units not functionalized with a reactive group" or, analogously, "monomers not functionalized with a reactive group" can be referred to as "repeating units without a reactive group" or as "monomers without a reactive group". In some cases, non-covalently bonded reactive groups, i.e. those remaining in the crosslinked polymer, can be hygroscopic or react with moisture or water molecules. This can change the material properties and thus negatively affect the moisture resistance or moisture stability of a dielectric. Accordingly, the proportion of repeating units without a reactive group or preferably with a hydrophobic group or non-polar group can be used as a means of improving the moisture resistance of the dielectric.

In principle, according to the invention, more than one reactive group may also be arranged on a repeating unit with a reactive group. In such a case, it is particularly preferred that the direction of the reactive groups branching off from the main chain differs. For example, such groups may be arranged opposite each other on a polymer chain. However, it is particularly preferred that the repeating units with a reactive group each carry only a single reactive group. This is preferred because the linking points can thus be distributed more evenly over the polymer chain than if a few repeating units have a large number of reactive groups. In this way, highly agglomerated junctions can be avoided. In this way, a more homogeneous polymer material can be obtained.

It is possible to obtain a first control option for the overall degree of cross-linking (absolute degree of cross-linking) in the dielectric via the proportion of reactive groups or via the proportion of repeating units with a single reactive group in the overall polymer chain.

Another way of controlling the overall degree of cross-linking is by adding the linker molecules. The maximum possible absolute degree of crosslinking for a polymer chain or polymer chains can be defined by the number of reactive groups. The degree of crosslinking can be set by the amount of linker molecules, as long as the amount of linker molecules is at most sufficient to react with all reactive groups present or to covalently bond with them.

A relative degree of cross-linking can be defined here. The relative degree of crosslinking is the proportion of reactive groups that are or will be covalently bonded to a linker molecule. In other words, this is the ratio of the number of reactive groups that are covalently bonded to a linker molecule to the total number of reactive groups present before the crosslinking step. As an alternative to the total number of reactive groups present before the crosslinking step, the sum of reactive groups not covalently linked to a linker molecule after crosslinking and the number of reactive groups that are covalently linked to a linker molecule can also be used as the denominator in the equation. Furthermore, an absolute degree of cross-linking can be defined. The absolute degree of cross-linking is the proportion of cross-links per all repeating units of a polymer chain. It should be noted that a repeating unit that is functionalized with several reactive groups can cause several cross-links. Accordingly, in this case more than one crosslink per repeating unit can be included in the absolute degree of crosslinking.

The linking points on the linker molecule are preferably functional groups on the linker molecule which are suitable for forming a covalent bond with at least one reactive group. The formation of such a bond can also be referred to as a cross-linking reaction in relation to the process. In principle, single bonds or multiple bonds can be formed. Multiple bonds are also only included as one bond in the degrees of crosslinking defined above.

It is preferred that linking points of a linker molecule are spatially separated from each other. For example, two linking points can be attached to two different atoms of the linker molecule. In principle, it is possible for a linking point to form a covalent bond to more than a single reactive group. It is noted here that such a multiple linkage is also included in the absolute degree of crosslinking with the number of covalent bonds formed.

The inventors of the present invention have discovered that a temperature stability of the polymer dielectric can be set via the relative and absolute degree of crosslinking. Thus, a polymer dielectric produced by a method according to the invention can have a high temperature stability. In particular, the temperature stability can allow the dielectric to be used at 150° C. or above. Furthermore, it was recognized that the temperature stability of the dissipation factor and the level of the dielectric constant, also known as permittivity, can be influenced or adjusted via the relative and absolute degree of crosslinking. Dielectrics with dielectric constants of 3.0 or higher can be obtained.

The simple and precise adjustment of both degrees of crosslinking is relevant here, as too low an absolute degree of crosslinking can result in too low a temperature stability, for example if the reactive groups involved in the crosslinking reaction are converted to more temperature-stable analogs by the crosslinking reaction. However, if the absolute degree of crosslinking is too high, the dielectric or the polymer material of the dielectric can become brittle, which means that it cannot withstand mechanical stresses sufficiently.

Since two components, namely polymers with reactive groups and linker molecules, are involved in the crosslinking process according to the invention, this can be referred to as a two-component system. The adjustment of the absolute degree of crosslinking can be carried out more precisely using two components and more easily in a large-scale overall process than in a one-component system. In a one-component system, for example, only one reactive group is provided on a polymer to form a crosslink directly with another reactive group or a polymer chain. Consequently, the present process according to the invention, which is a two-component system, may have the advantage over the approach according to the non-patent literature 1, which describes a one-component system, that there is a higher fault tolerance in the individual process steps. For example, in the process according to the invention there is a wide fault tolerance with regard to the proportion of reactive groups or the proportion of repeating units that are functionalized with a reactive group. The final degree of cross-linking can be precisely adjusted by the amount of linker molecules added, which can be done without great technical effort. The basic properties of the dielectric can be specifically defined by selecting the monomers and the properties can be fine-tuned by selecting the linker molecule.

Furthermore, the inventors of the present invention have recognized that the dielectric properties of the material can be influenced or adjusted by the selection of the reactive groups and the linker molecule or by the resulting bridging covalent cross-linking unit. In particular, the inventors have recognized that the dielectric constant can increase with a high relative and absolute degree of crosslinking.

As explained above, some of the reactive groups may remain unreacted. The inventors of the present invention have found that reacted and unreacted reactive groups affect the dielectric properties of the dielectric differently. In particular, reacted reactive groups, i.e. the establishment of cross-links, can improve the temperature stability and the loss factor. By means of remaining unreacted reactive groups, the dielectric constant can be increased. The inventors of the present invention have thus recognized that in many cases it may be more advantageous to leave a proportion of unreacted reactive groups in the dielectric in order to adjust the dielectric properties of the material and, in particular, to increase the dielectric constant. This has the advantage that the same type of functional groups can be used on the polymer chains to produce cross-links, wherein the exact proportion of reacted and unreacted groups is set via the linker molecule, and also to define dielectric properties. In this way, a complex functionalization with different functional groups, some of which are responsible for setting the cross-linking and others for setting the dielectric properties, can be avoided. According to such an approach, it is preferred that the proportion of unreacted linker molecules remains low and preferably zero within the technically feasible range.

According to a preferred aspect, a proportion of repeating units comprising a reactive group relative to all repeating units is between 20% and 100%.

The relative and absolute degree of crosslinking can be advantageously adjusted via the above-mentioned proportion of repeating units in the polymer chains with a reactive group in order to ensure sufficient temperature stability and to adjust the dielectric properties. The proportion defined above is particularly preferred if only a single such group is attached to repeating units with a reactive group. A proportion of 40% and 70% of repeating units with a reactive group is particularly preferred. Here, the above-mentioned effects are particularly pronounced.

According to a further preferred aspect, a proportion of reactive groups which are or become covalently bonded to a linker molecule can be between 25% and 99%. The relative degree of crosslinking can thus be between 25% and 99%. For this relative degree of crosslinking, it was found that both the dielectric properties and the temperature stability can be advantageous. In particular, it has been found that a proportion of repeating units having a reactive group as defined above, together with the relative degree of cross-linking disclosed herein, facilitates the achievement of a temperature stability of above 150° C.

In order to improve stability and dielectric properties at higher temperatures, it is particularly preferred if the relative degree of crosslinking is between 70% and 99%. It is even more preferred if the relative degree of crosslinking is between 95% and 99%. For the preferred or even more preferred range, the technical effects are particularly pronounced.

Furthermore, it is preferred that an absolute degree of cross-linking, i.e. the proportion of covalent compounds per total number of repeating units, is set to between 5% and 99%. Even more preferably, the absolute degree of cross-linking is between 18% and 60%. Even more preferably, the absolute degree of crosslinking is between 40% and 60%. This allows the above-mentioned objectives to be achieved even better. This range is particularly preferred if only one such group is arranged on repeating units with a reactive group.

It is preferred for the process that at least some of the repeating units with a reactive group are acrylate repeating units or repeating units based on acrylates. Preferably, the reactive group can be attached to the acrylate repeating unit or acrylate-based repeating unit by means of the acrylate function via an ester bond or, analogously, via an amide bond.

It is preferred that the polymer chains are formed with acrylate monomers. Polymerization turns these into acrylate repeating units in the polymer chain. A preferred process here is radical polymerization.

A reactive group can be attached via the ester bond. Thus, the monomers or repeating units with a reactive group may comprise acrylate monomers or acrylate repeating units. Even more preferably, all repeating units with a reactive group are acrylate repeating units.

The inventors of the present invention have found that polymer chains or copolymer chains which contain acrylate repeating units are particularly well suited for functionalization with reactive groups, as these can be easily attached chemically via the ester bond.

According to a preferred aspect, the reactive group contains an epoxide. Here, the linker molecules contain functional groups which are suitable for reacting with an epoxide. In particular and preferably, the functional groups can be selected from carboxylic acids, amines, alcohols and anhydrides.

Preferably, the epoxy is a terminal group. In other words, it is preferred if the epoxy oxygen bridges a terminal carbon atom with a neighboring carbon atom. This has the advantage that the epoxy group is sterically easily accessible, which contributes to an efficient crosslinking reaction. For example, it can be a gylcidyl group. This can preferably be introduced into the polymer chains in the form of glycidyl methacrylate monomers as a homo- or copolymer. Glycidyl methacrylate repeating units can be used in the polymerized polymer chains.

Crosslinking can easily be achieved by reacting an epoxide with the above-mentioned groups. In this case, easy can mean in particular that a stoichiometrically complete cross-linking reaction can be achieved by mild thermal heating to 30° C. to 150° C. The absolute and relative degree of crosslinking can therefore be precisely adjusted.

With an epoxide as the reactive group, the values given above for the proportion of monomers or repeating units with a reactive group and for the relative degree of cross-linking are particularly preferred.

In principle, a two-component crosslinking can also be carried out in the so-called grafting-from type. This is particularly possible in connection with the use of epoxides.

In particular, a reactive group on the polymer chain can be used to link two chains together via a reaction that can otherwise usually serve as a polymerization reaction. In particular, several small molecules can form oligomer-like or polymer-like structures starting from one reactive group towards another reactive group on another polymer chain. Alternatively, compounds within a chain can be produced by the same type of reaction. For example, a terminal epoxide group can react with epoxide monomers, such as ethylene oxide, propylene oxide or epoxybutane, after cationic initiation.

According to another preferred aspect, the crosslinking, i.e. the formation of at least some covalent bonds between reactive groups and the linking points, can take place via an $S_N1$ or $S_N2$ reaction, or such a reaction can be involved.

The term $S_N1$ or $S_N2$ reaction is used here to subsume all reactions, in particular also reactions of carboxylic acid halides, which proceed according to an addition-elimination mechanism in which a leaving group is involved and a nucleophile can attack a carbon atom from which the leaving group has left or from which the leaving group leaves during the process.

Preferably, the reactive group has the leaving group. The linker molecule preferably contains nucleophilic sites or nucleophilic functional groups as linking points.

An example of a leaving group can be a halogen on a carbon, but also an oxygen in an epoxide. Amines or alcohols, for example, can act as nucleophiles. Alternatively, carboxylic acid halides can also be used. This is particularly preferable in the area of grafting-from reactions.

According to a further preferred embodiment, a Markownikov addition or an anti-Markownikov addition may be involved in the crosslinking. The anti-Markovnikov addition is preferred.

An example of a particularly preferred anti-Markownikov addition can be a thiol-ene click reaction of a thiol with a carbon-carbon double bond of an alkene to form a thioether. In the case of a thiol-ene click reaction, it is preferred either that the reactive group is the thiol and the linker molecule has carbon-carbon double bonds as linking points, or that the linker molecule has thiol groups as linking points carbon-carbon double bonds represent the reactive groups.

In principle, a large number of different reactive groups and linker molecules can be used for the process according to the invention, which can also be present side by side within a system. In principle, a linker molecule can also have chemically different linking points. This is even preferred in some cases and can be used to adjust dielectric properties. However, it is preferable that all linking points can form covalent bonds with all reactive groups present in the system under similar or identical reaction conditions. This means that different conditions for crosslinking in the process can be avoided and the process can be made technically simple. Furthermore, it is even more preferred that only a single type of reactive group is present in a system and only a single type of linking point is added. This is preferred in order to avoid unexpected side reactions and in particular to keep the composition simple. For example, epoxides can be used as the reactive group. It can be that only epoxides are used. The epoxides can also be part of different functional groups. Accordingly, a single type of linking point can occur in the system, for example, exclusively amines or instead exclusively carboxylic acids can occur as linking points. However, the linker molecules may differ.

As explained above, even in a simple system with only a single type of reactive group and a single type of linker molecule, the degree of cross-linking and the dielectric properties as well as the temperature stability can be well controlled.

According to a preferred aspect, the method comprises a step of deposition from solution or reactive extrusion.

In the procedure, the dielectric can therefore be formed by or with deposition from solution or by or with reactive extrusion.

The process according to the invention is very flexible and can therefore be applied or adapted to both of these separation methods.

Deposition from solution can be carried out before crosslinking. For example, a solution containing polymer chains and linker molecule can be deposited on a substrate or a first electrode. Crosslinking can take place after deposition.

It is generally preferred that the dielectric is formed as a layer, i.e. as a dielectric layer.

In particular, a homopolymer or a copolymer with acrylate repeating units is preferred in order to be able to use both deposition from solution and reactive extrusion to produce the dielectric. A copolymer is particularly preferred here.

This can be seen as an advantage over the frequently used biaxially oriented polypropylene BOPP, which is usually only produced by calendering.

According to a further preferred aspect of the process, the polymer chain is a copolymer comprising acrylate repeating units and repeating units with a non-polar or unsaturated hydrocarbon group. A proportion of acrylate repeating units is preferably 20 to 80%. Even more preferably, a proportion of acrylate repeating units in a corresponding copolymer can be between 40 and 60%. Even more preferably, such a proportion can be between 45 and 55%.

In the copolymer, acrylate repeating units have the advantages described above. Via the portion of repeating units with a non-polar or unsaturated hydrocarbon group water absorption can be reduced or moisture resistance can be improved.

According to a further preferred aspect, the crosslinking can be carried out by annealing at a temperature suitable for effecting a crosslinking reaction. Furthermore, it is preferred here that the temperature is suitable for the crosslinking reaction to take place to at least 99% relative to the component selected from reactive groups and linker molecules present in a lower proportion with respect to reaction equivalents.

In other words, either the proportion of reactive groups or the proportion of linker molecules in relation to a complete reaction is present in the lower amount. Preferably, the linker molecule is present in the lower amount. The annealing temperature should be suitable for bringing about a reaction that is at least 99% complete in relation to the minority component. Even more preferably, the annealing temperature is suitable for bringing about a stoichiometrically complete reaction within the technically feasible range.

Crosslinking with the formation of covalent bonds is technically possible by annealing without much effort.

According to a further aspect, a method of manufacturing a capacitor is disclosed. The method of manufacturing a capacitor comprises manufacturing a dielectric according to the method described above. Furthermore, the method comprises producing a dielectric layer with or from the dielectric. Furthermore, an electrode is attached to one side of the layer. Electrodes can also be attached to both sides of the layer. A technically functional capacitor has two electrodes, only one of which, however, needs to be in direct contact with the dielectric layer.

In many embodiments, it is preferred that both electrodes are in direct contact with the dielectric layer. In this case, it is often preferred that the first electrodes sandwich the dielectric layer.

Preferably, the dielectric is formed as a dielectric layer, e.g. using the methods mentioned above.

The process for the capacitor and the capacitor produced with it have the same advantages as those described above for the process for producing the dielectric for a capacitor.

Attaching an electrode to one side of the dielectric layer can preferably mean that the electrode is applied directly to the layer.

Preferably, the entire dielectric consists exclusively of the cross-linked polymer material except for technically unavoidable impurities, such as radical starters or similar residues.

According to a further preferred aspect, a capacitor is provided. Preferably, a dielectric layer of the capacitor can be produced by the method described above. Even more preferably, the capacitor can be produced by the method described before.

The capacitor has at least one electrode, which is arranged on the dielectric layer. Alternatively, two electrodes can be arranged on both sides of the dielectric layer. The dielectric layer has a polymer material in which polymer main chains are covalently linked to each other or to themselves via bridging linker molecules.

As the capacitor is preferably produced using the process described above, polymer main chains can preferably be identified in the crosslinking polymer material, which have as building blocks the repeating units formed from monomers or consist of these. The polymer main chains preferably have side groups branching off from them, which form a crosslink to another polymer main chain or to another point on the same polymer main chain. A branching side group preferably comprises at least one reacted reactive group, a reacted linker molecule attached thereto and a further reactive group which is arranged at a different site of the reacted linker molecule. Particularly preferably, the linker molecules here correspond to the linker molecules mentioned above.

Furthermore, the functional groups to which the linker molecules in the polymer material are attached are preferably reactive groups as described above.

Preferably, a capacitor according to the invention can also have unreacted reactive groups in addition to the reacted reactive groups. This has the advantages mentioned above.

According to a preferred aspect, the proportion of repeating units to which a linker molecule is covalently bonded is between 5% and 99%. This is the absolute degree of crosslinking as defined above.

The absolute degree of cross-linking is preferably 18% to 60% and even more preferably 40% to 60%.

In the above-mentioned range of the absolute degree of cross-linking, good temperature stability can be achieved, allowing the capacitor to be operated at 150° C. or above.

According to a preferred aspect, the polymer main chains contain acrylate repeating units, wherein functional groups which are covalently bonded to a linker molecule or are suitable for such a bond are attached to the acrylate repeating units via an ester bond.

The polymer chains can thus be a homo- or copolymer comprising acrylate repeating units.

The functional groups suitable for bridging crosslinking preferably comprise reacted and unreacted reactive groups. As explained above, acrylate repeating units have the advantage that the ester group enables the attachment of functional groups suitable for crosslinking, i.e. reactive groups in the sense of the process described above.

According to a further preferred aspect, the proportion of repeating units which are covalently linked to a linker molecule via a functional group relative to the sum of these repeating units and the repeating units having a functional group suitable for covalently linking to a linker molecule is between 25% and 99%.

As explained above, this may correspond to the relative degree of cross-linking in the case where each repeating unit with a reactive group has only one such group. This results in the advantages outlined above. The advantages are particularly pronounced in the case where acrylate repeating units with reactive groups or linking functional groups are included.

According to a further preferred aspect, the covalent compound or the covalently linking functional group is selected from an ether bridge, an ester bridge, an amine bridge, amide bridge and a thioether bridge.

These covalently connecting bridges preferably correspond to the covalent links produced by the above-mentioned processes. This results in the corresponding advantages.

According to another preferred aspect, the capacitor is a multilayer component. The multilayer component contains a large number of electrodes, which are stacked alternately with the dielectric layers. The electrodes are preferably contacted via outer electrodes. A lamination direction can be defined in a multilayer component. The layers of the multilayer component are preferably aligned perpendicular to this direction.

A multilayer component can preferably be used as a so-called SMD component (surface mounted device).

According to another preferred aspect, the capacitor is a wound capacitor. A wound capacitor preferably has only two first electrodes, between which a dielectric layer is sandwiched. This sandwich-like structure is wound into a capacitor roll.

According to a further aspect, the use of a material described above in a dielectric is also described. In addition, the use of a dielectric in a capacitor is also described. In this case, the dielectric has the features described above or is produced using the process described above.

In the following, the invention is described in more detail with reference to the figures. The figures include both chemical reactions and representations of components. In particular, the components are not shown to scale. The sizes of components may be distorted. Lengths or length ratios cannot be taken from the drawings.

DETAILED DESCRIPTION

Figure 1:
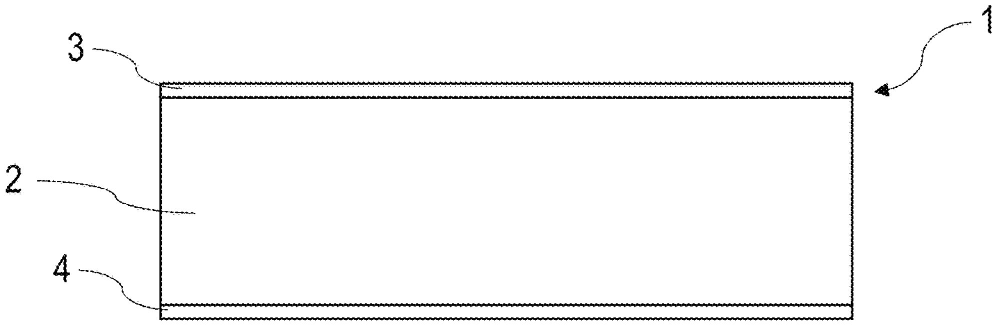
FIG. 1 shows a capacitor.

FIG. 1 shows a schematic representation of a simple capacitor 1, which may be a plate capacitor, for example. The capacitor 1 has a first electrode 3 and a second electrode 4. A dielectric layer 2 is arranged between the first electrode 3 and the second electrode 4. The dielectric layer 2 has a dielectric or polymer dielectric made of a polymer material produced in accordance with the process according to the invention. The polymer material can, for example, be contained in a layer in the dielectric 2 or the layer can consist of it (both not shown). Furthermore, the material of the dielectric layer 2 can comprise a mixed material of the polymer material according to the invention and other polymers. Preferably, the dielectric layer 2 consists exclusively of the cross-linked polymer material according to the invention. Here, "consists of" means that it exclusively contains a material according to the invention, yet technically unavoidable impurities such as solvent residues or radical initiators may also be contained in the material. Their proportion is preferably less than 1%.

Figure 2:
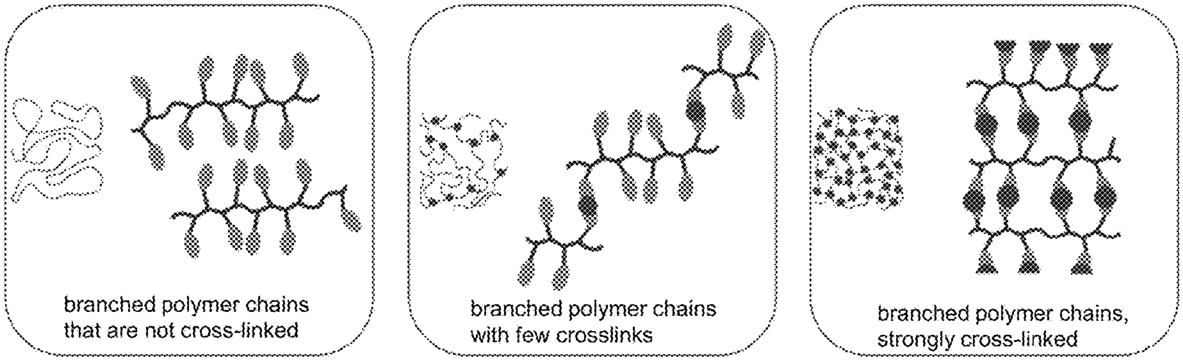
FIG. 2 schematically shows various general crosslinking modes in polymers.

FIG. 2 shows a schematic sketch of three possible states of polymers. The image on the left shows a branched polymer chain that is not cross-linked.

Branched here means that the functional groups shown here as gray ellipses branch off from a polymer chain or a polymer main chain. The polymer main chain has no crosslinking or crosslinking to other polymer chains or within itself.

The middle image shows a polymer chain similar to the left-hand image, although here individual links have also been formed via reactive groups, as shown by the connecting dots. For the purposes of the present invention, the connecting dots connecting the ellipses represent the linker molecules.

The image on the right shows a strong degree of crosslinking, according to which a linkage occurs via each of the branching functional or reactive groups.

Figure 3:
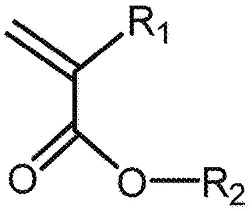
FIG. 3 shows a general formula for an acrylate monomer.

FIG. 3 shows a general acrylate structure, which is a preferred monomer for the process according to the invention.

The structure according to FIG. 3 has two types of groups $R_1$ and $R_2$. Furthermore, the structure has a carbon-carbon double bond. Via the carbon-carbon double bond, a polymerization reaction can take place by radical chain reaction as shown below.

The group $R_1$ can be any group. In particular, it can preferably be hydrogen or a methyl group. Alternatively, one of the following groups may be present in the radical $R_1$ or $R_1$ may consist of one of the following groups: Alkyl groups, alkaryl groups, heteroalkyl groups, heteroaryl groups, alkenyl groups, halogen or a halide, amino groups, amide groups, carboxylic acid groups, ester groups, hydroxy groups, ether groups, imide groups, thiol groups and thioether groups.

The group $R_2$ can also carry a large number of groups. Preferably, a reactive group is arranged on the group Rz via the ester bond.

As shown below, it is particularly preferred if a glycidyl group represents the group $R_2$. A glycidyl group has a terminal epoxy group. In principle, however, any type of group which has an epoxide can be used as the group $R_2$. Terminal epoxy groups are particularly preferred.

A linkage can take place via epoxy groups, but also via other suitable groups, via a reaction of the grafting-from type. In particular, a polymerization-type reaction can be used here, which starts at a reactive group of a polymer chain and then forms an oligomer-like or polymer-like side chain, which in turn attaches to another polymer chain or to another point of the first polymer chain and thus ends. This is achieved via small molecules, which can be referred to as grafting-from monomers. These form grafting-from repeating units between two reactive groups. In particular, grafting-from monomers can be selected from ethylene oxide, propylene oxide or 1,2-epoxybutane.

Alternatively, the residue $R_2$ may contain a halide.

Furthermore, the entire oxygen $R_2$ motif ($O—R_2$) can be replaced by a halide, whereby a carboxylic acid halide forms the reactive group.

As a further alternative, a thiol group can be arranged on the polymer chains as the radical $R_2$ or via the group $R_2$. As a further alternative, a carbon-carbon double bond can be arranged as a reactive group via the functional group $R_2$. For example, the carbon-carbon double bond may be a terminal double bond.

Figure 4:
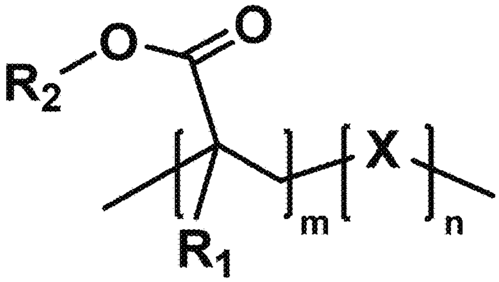
FIG. 4 shows a general representation of a copolymer containing acrylate repeating units.

FIG. 4 shows a copolymer chain. The copolymer chain has an acrylate repeating unit as a first repeating unit, which is preferably formed from an acrylate monomer as shown in FIG. 3. The copolymer further comprises C as a second repeating unit of the copolymer. The acrylate repeating unit or X may in principle be combined in any form of copolymer, such as a block copolymers. For a practical process, it may be preferred that the repeating units of the copolymer are randomly distributed along the chain. Alternatively, copolymers may have a periodic arrangement of repeating units. This can be formed, for example, by polymerizing dimers or other preformed units of monomers. In addition to the example of the acrylate-containing copolymer, these concepts can also be applied analogously to any type of copolymer or terpolymer.

The acrylate repeating unit in FIG. 4 can also be seen as a placeholder for another monomer.

X can preferably be selected from a linear branched or cyclic polysiloxane, a polyolefin or a heteroatom polyolefin. These can also optionally be functionalized with alkaryl groups, alkenyl groups, halogen groups, amino groups, nitrile groups, nitro groups, alcohols, carboxylic acid groups, carboxylic acid ester groups or thio groups. Particularly preferred is also X an acrylate repeating unit with a non-polar group. Thus, the polymer or the polymer chains is preferably a copolymer of glycidyl methacrylate and an acrylate repeating unit with a non-polar group.

Figure 5:
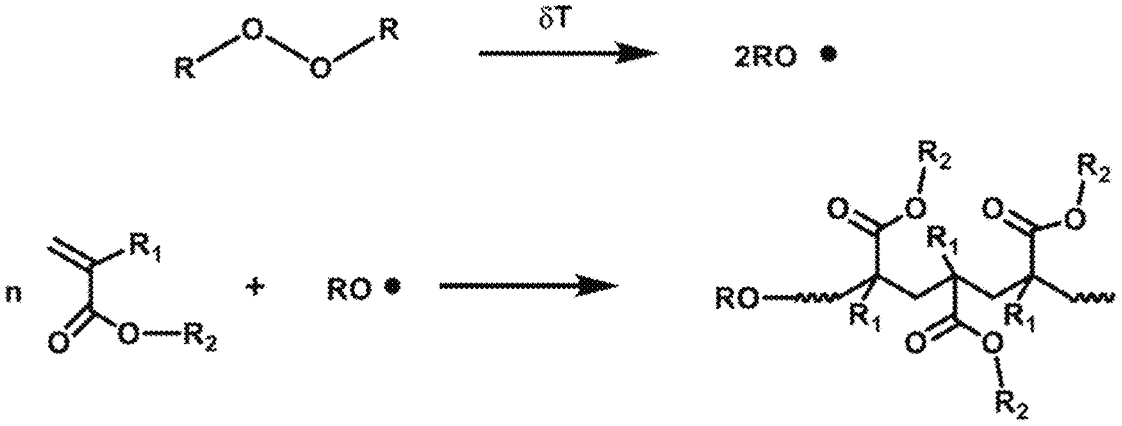
FIG. 5 shows a radical polymerization.

FIG. 5 shows an example of a radical chain reaction. The example in FIG. 5 shows a polymerization reaction in which acrylate monomers according to FIG. 3 are polymerized. However, the scheme applies analogously to any conceivable radical polymerization.

A radical initiator such as an organic peroxide is split into two radicals by thermal or photochemical reactions. The organic peroxide can then attack a carbon-carbon double bond of a monomer, such as an acrylate monomer. This in turn forms a radical and the chain reaction can continue. The chain reaction is terminated by a termination reaction. Radical polymerization can lead to normally distributed polymer chain lengths for which an average chain length or a molecular mass can be specified. Furthermore, it leads to statistically distributed repeating units within a polymer chain for the formation of copolymers.

Block copolymers or block terpolymers do not have a statistical distribution of repeating units.

For an acrylate-containing copolymer according to the invention, for example, an average mass of 32 kDa (written out: 32 kilodaltons) can be achieved.

It is preferred that the polymer chains only have short branches consisting of functional groups branching off from the main chain. Branches of polymer chains, i.e. forking of the polymer main chain, is not preferred.

Figure 6:
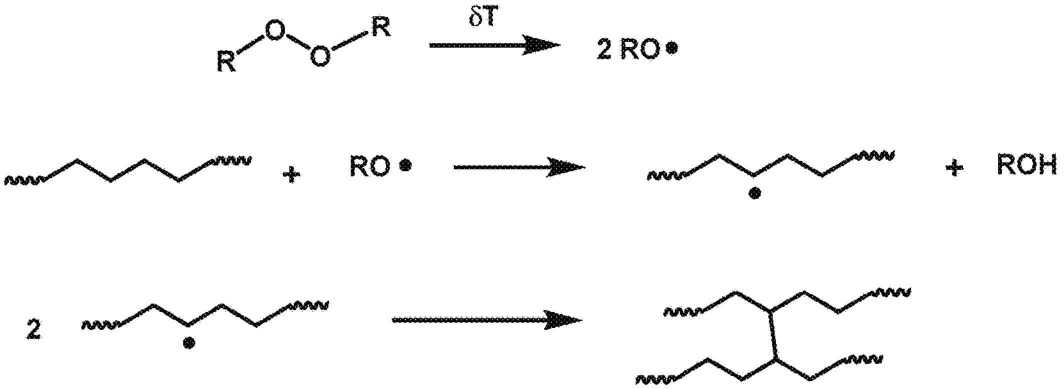
FIG. 6 shows a side reaction of a radical polymerization.

As shown in FIG. 6, the radical chain reaction may under certain circumstances result in two polymer chains being linked or bridged as a side reaction. According to the present invention, it is preferred that the proportion of corresponding crosslinking reactions or the proportion of bridged polymer main chains is low. In particular, the degree of crosslinking achieved in this way is preferably significantly lower than the degree of crosslinking achieved via the crosslinking reactions described below. A degree of crosslinking of less than 1% is preferred, which allows solution in organic solvents.

Figure 7:
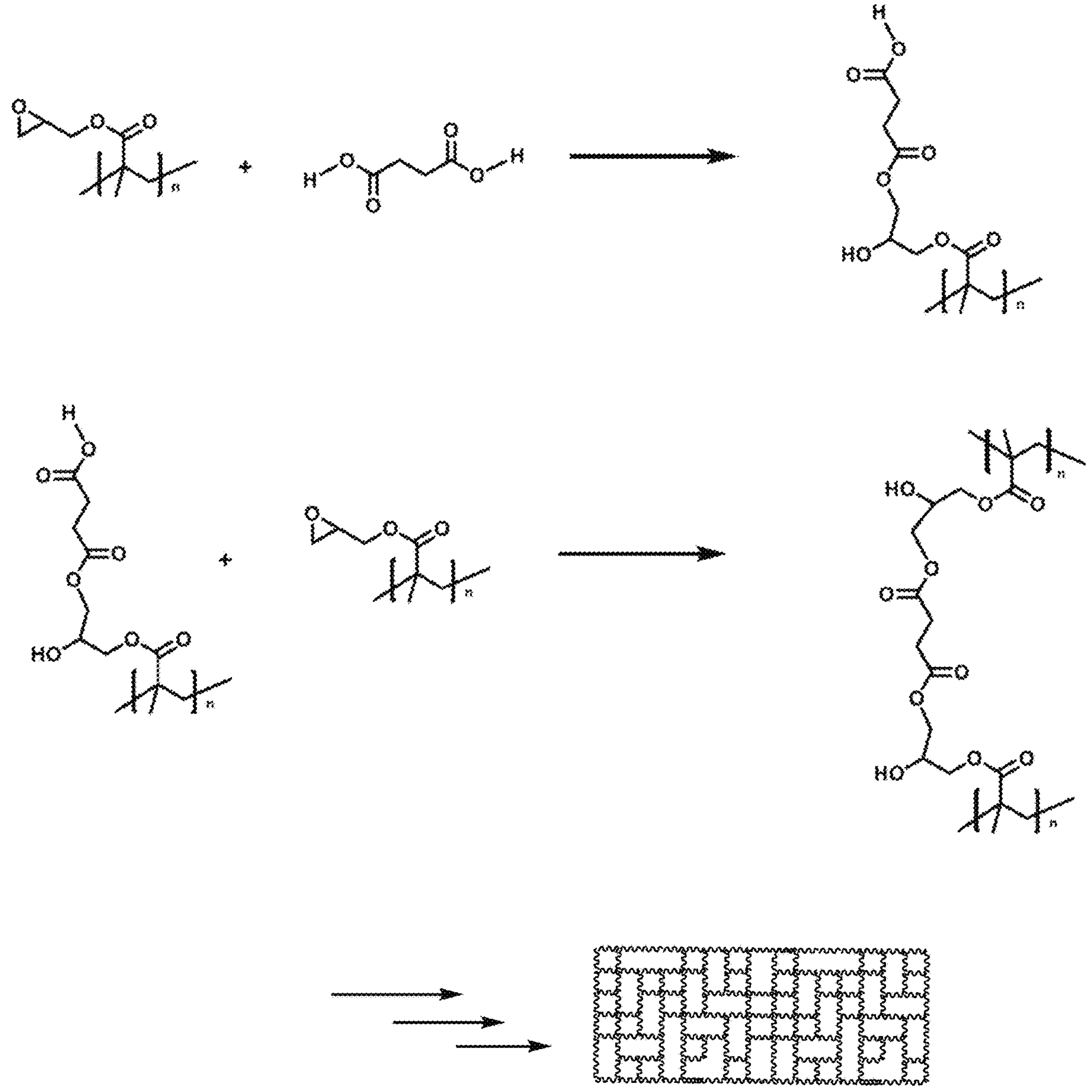
FIG. 7 shows a first cross-linking reaction.

FIG. 7 shows a first example of a crosslinking reaction. It can be regarded as exemplary for any crosslinking that takes place by means of an epoxide (terminal epoxide) as a reactive group and a carboxylic acid-containing linker molecule. Succinic acid is shown here as an example of the carboxylic acid-containing linker molecule or, in particular, of a bifunctional carboxylic acid (dicarboxylic acid). Alternatively and just as preferably, oxalic acid, valonic acid or adipic acid can also be used, for example. The carboxylic acid groups or the singly bound oxygen therein can act here as a linking point. In the case of the linker molecules described above, it is preferred that the linking points are located at points of the molecule which are at maximum distance from one another.

In the reaction, the single bonded oxygen of the acid group attacks the terminal carbon of the epoxy group with a free pair of electrodes as a nucleophile. The proton is transferred to the previous epoxy oxygen and an ester bond is formed. Alternatively, the acid group can first be deprotonated and the carboxylate group formed can attack as a nucleophile.

It is preferable that the repeating units and the structures formed from the linker molecules and the reactive groups can be identified within the polymer chains. After completion of the crosslinking reactions, which have linked a polymer chain to a linker molecule via the two reactive groups, it is possible in this example to identify the original monomers of the polymer, as well as the reactive groups and the linker molecule, even in reacted form. This is not mandatory, but is preferably generalized for each reaction according to the invention.

The second partial reaction of crosslinking starts from the product of the first partial reaction, with the second carboxylic acid again attacking an epoxy group in an equivalent manner. This forms a cross-link between two polymer chains or, analogously, within two sections of a single polymer chain.

Figure 8:
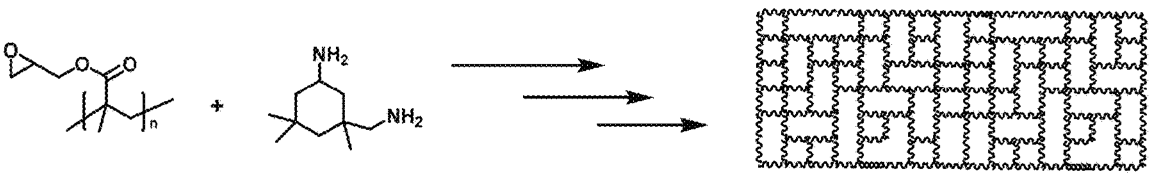
FIG. 8 shows a second crosslinking reaction.

FIG. 8 shows a second reaction or the reactants of a second crosslinking reaction, which form a polymer network. Polyglycidyl methacrylate is again shown as a representative of all epoxy-functionalized acrylates. The linker molecule shown here is isophorone diamine, which is representative of amine-based linker molecules. Alternatively and equally preferably, for example and also preferably, p-xylylenediamine, 1,5-diamino-2-methylpentane, ethylenediamine and hexamethylenediamine can be used as linker molecule. Alternatively, one of the amine groups can also be replaced by an alcohol group. An example of this may be ethanolamine, diethanolamine, N-benzylethanolamine, 2-amino-2-methylpropionic acid and 2-amionocyclopentanol.

According to the reaction mechanism of the reaction shown in FIG. 8, the primary amine can act as a linking point and attacks the terminal carbon of an epoxy group as a nucleophile. This produces cross-links. In the present example, more than one reactive group can react with the primary amine as a linking point. In the present example, two neighboring epoxy groups on a polymer chain can each react with an amino group to form a tertiary amine. This requires the reactive groups to be sufficiently close together on the polymer chain. In a copolymer with repeating units without a reactive group, this reaction can be suppressed if the repeating units with a reactive group are sufficiently isolated. In such a case, the reaction can also only lead to the formation of a secondary amine.

A primary amino group according to the present example is thus an example of a linking point with which more than one reactive group can react.

Alternatively, a molecule with alcohol groups or secondary amines as linking points can be used as the linking molecule.

Figure 9:
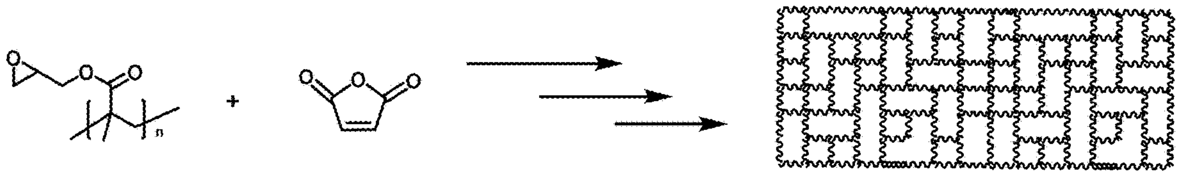
FIG. 9 schematically shows a third crosslinking reaction.

FIG. 9 shows a third example of a crosslinking reaction. Polyglycidyl methacrylate is again shown as representative of all epoxy-functionalized acrylates. Here, maleic anhydride is shown as an example linker molecule. Alternative anhydrides can be selected, for example, from anhydrides of the carboxylic acids mentioned in FIG. 7, phthalic anhydride and methylated phthalic anhydride.

Figure 10:
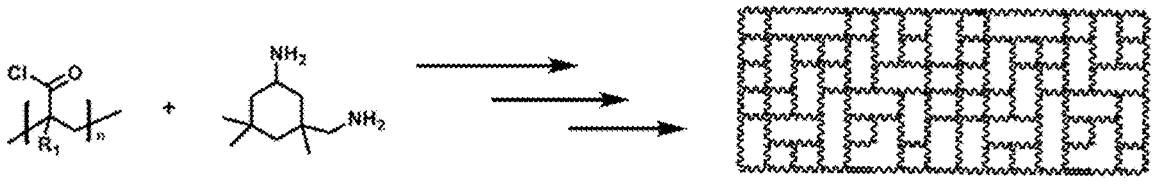
FIG. 10 schematically shows a fourth crosslinking reaction.

FIG. 10 shows an example of a fourth crosslinking reaction. The reactants shown are a polyacrylate derivative with a carboxylic acid chloride and isophorone diamine as the linker molecule. The acid chloride group is the reactive group that reacts with the primary amine groups of the isophorone diamine to form amides. Alternatively, other suitable leaving groups, such as other halogen-functionalized functional groups, can also be used.

Isophorone diamine is representative of bifunctional amines as linker molecules. Alternatively and also preferably, ethylenediamine or hexamethylenediamine, but also triamines can be used. Alternatively, one of the amino groups can also be replaced by an alcohol group. Examples of such molecules are ethanolamine, diethanolamine or 2-aminocyclopentanol.

The two amino groups of the isophorone diamine represent the (bisfunctional) linking points that attack acid chloride groups.

Figure 11:
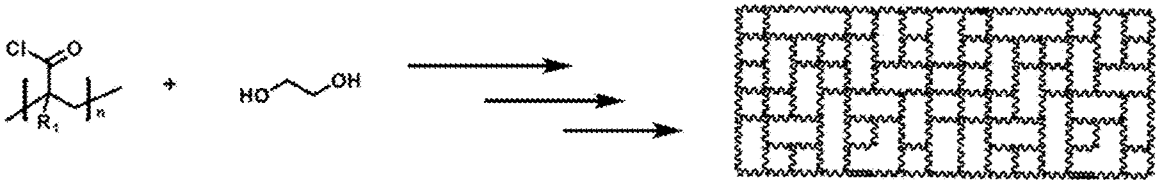
FIG. 11 schematically shows a fifth crosslinking reaction.

FIG. 11 shows a fifth crosslinking reaction. The reactants shown are a polyacrylate derivative with a carboxylic acid chloride and ethylene glycol as the linker molecule. As an alternative to the reactive group shown, the alternatives mentioned for FIG. 10 can also be used. Alternatively, for example, 1,4-butanediol, propylene-1,3-diol, pentaerythtriol or xylitol can be used as the linker molecule. The alcohol group acts as a linking point. The acyl chloride group is the reactive group that reacts with the alcohol groups to form esters.

Figure 12:
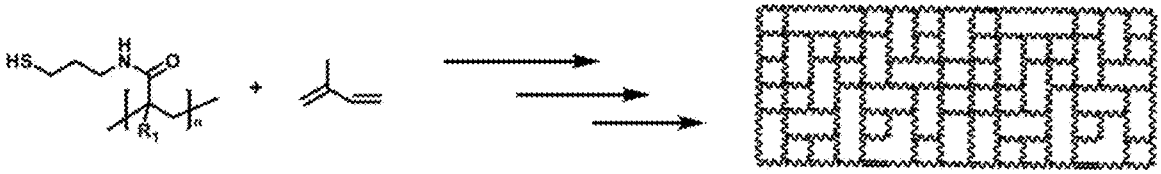
FIG. 12 schematically shows a sixth crosslinking reaction.

FIG. 12 shows a sixth example of a crosslinking reaction. The polymer has an amide bond as the point of attachment for the side group with the reactive group. The reactive group here is a terminal thiol group.

A diene with two carbon-carbon double bonds (alkenyl groups) is used as the linker molecule. The alkenyl group acts as a linking point. Through an anti-Markownikov addition or, in this particular case, through a thiol-ene click reaction, which takes place radically and can be initiated either thermally or photochemically, the thiol group can attack a double bond of the alkene or dialkene, whereby a thioether is formed.

Thermal initiators that can be used for this purpose include N,N-azobisisobutyronitrile, dibenzoyl peroxide, dicumyl peroxide or potassium persulphate. Benzoin or ethyl (2,4,6-trimethylbenzoyl) phenylphosphinate, for example, can be used as photochemical initiators.

Examples of unsaturated alkenes that can be used as linker molecules include 1,3-pentadiene, 1,4-pentadiene, isoprene, 2,4-hexadiene, hexa-1,3,5-trienes and 1,3-butadiene.

Figure 13:
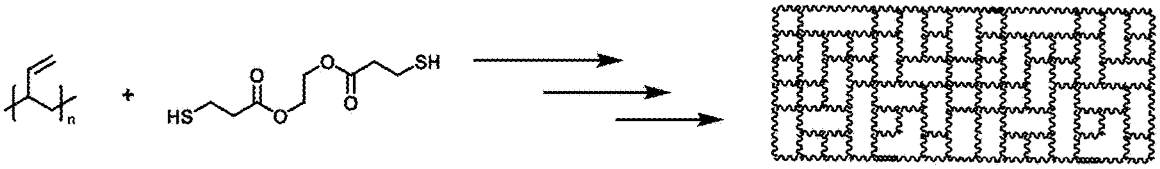
FIG. 13 schematically shows a seventh crosslinking reaction.

FIG. 13 shows a seventh example of a crosslinking reaction. Here, the polymer has a double bond as a reactive group. In this example, this is not attached to the chain via a heteroatom, but via a carbon-carbon bond. Ethylene glycol bis(3-mercaptopropionate) is shown here as a linker molecule for a thiol-ene click reaction as an example of an anti-Markownikov addition. Alternatively, glycol di(3-mercaptopropionate), glycol di mercapto acetate, trimethylolpropantri(3-mercaptopropionate) or pentaerythritoltetra(3-mercaptopropionate) can also be used.

Figure 14:
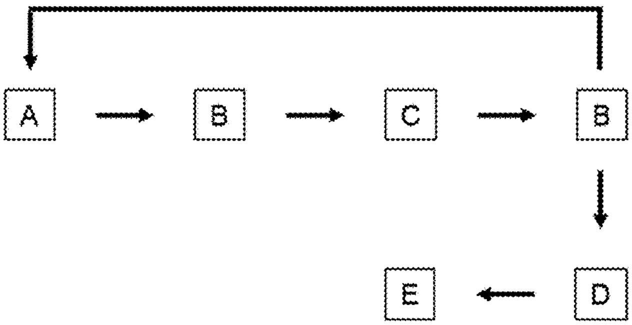
FIG. 14 shows a process diagram for manufacturing a capacitor.

FIG. 14 shows a schematic representation of a capacitor production process.

First, an electrode is formed according to step A. In principle, any suitable metal sheet or metal film can be used as electrode. Preferably, however, the electrode is applied to a substrate. Plastic films such as polyimide films or glass or a semiconductor wafers can be used as the substrate. A metallic layer can be applied to these using a suitable method. Preferably, physical vapor deposition (PVD) processes are used here. Examples of PVD are sputtering or thermal evaporation. The first electrode can consist of a single material such as aluminum or silver. Alternatively, multilayer electrodes such as chrome/aluminum, chrome/silver or chrome/nickel/aluminum or chrome/nickel/silver can be used. The layer thickness of the electrodes is in the order of several 10 nm and has a thickness adapted to the respective design.

The dielectric is then applied according to step B. In principle, reactive extrusion or deposition from solution can be used for dielectric production. For the process described here, deposition from solution is preferred. In particular, the polymer solution can be applied via slot diecoating, spray coating or stencil printing. The polymer solution contains the polymer chains in an uncrosslinked or very slightly crosslinked state. The polymer chains were produced by polymerization of monomers before deposition. The polymer chains can be homopolymers or copolymers, each of which contains repeating units with reactive groups. These can be attached to the monomers by functionalization before polymerization or to the repeating units after polymerization. Furthermore, the polymer solution contains solvents which keep the polymers in solution. For a poly(glycidyl methacrylate) according to the invention or corresponding copolymers, ethyl acetate, ethyl lactate or chloroform can preferably be used as solvents. The polymer solution can have a polymer concentration of 20 to 500 mg/ml. Further additives may be included. In addition, a defined proportion of linker molecule is added to the polymer solution. The amount of linker molecule is determined by the proportion of reactive groups and the degree of crosslinking to be achieved. The linker molecules have at least two linking points that are suitable for reacting with reactive groups. Furthermore, the crosslinking of the polymer chains is carried out in step B. Depending on the system, this can be carried out in different ways. Thermal crosslinking by annealing at 30 to 150° C. is preferred.

A second electrode can now be applied in step C using a PVD process. In principle, the second electrode can be manufactured or deposited from the same materials as the first electrode. To produce a capacitor as shown in FIG. 1, only steps A, B and C are carried out. A possible substrate can be removed after step C in such a case. Accordingly, steps A, B and C can be carried out for a wound capacitor.

In the case of a multilayer capacitor as shown in FIGS. 21 to 24 and described below, steps A, B, C and a subsequent repeated step B are repeated any number of times to form the layers. In particular, in the case of a multilayer capacitor, a protective varnish or other protective device or barrier layer can then be applied in an optional step D. This preferably consists of a temperature-stable inert hydrophobic hydrocarbon such as parylene or fluorine-based hydrocarbons (EFTE, PTFE, or similar). This can be applied using vapor deposition processes or solvent-based coating processes, such as spray coating or screen printing. The barrier layer is not applied to the sides on which the inner electrodes or the electrodes of the multilayer component are exposed. In a final step E, side contacts or outer electrodes are applied to the sides on which the respective (inner) electrodes are exposed. This can be made of brass, copper and tin or aluminum or silver. Other suitable current-conducting materials, preferably metallic materials, can also be used for this purpose.

For a multilayer capacitor, electrodes that act as inner electrodes can be structured.

Alternatively, the dielectric layer can also be produced by not applying it directly to the electrodes, but by depositing the layer from solution on a substrate which is provided with a suitable release agent. After a crosslinking step, which can be carried out as described above, a film can be produced which can then be further processed into a multilayer capacitor or a wound capacitor.

Calendaring or reactive extrusion can also be used as an alternative method of producing a film. In particular, the reactive components, i.e. the polymer chains with the reactive groups and the linker molecules, can be mixed together using a twin-screw extruder and these can react with each other at the same time. A film can then be formed by calendaring from the cross-linked reacted material. This method is preferred for the production of a wound capacitor, as well as for the production of a "stacked" capacitor produced by winding. The film or layer produced in this way can then be metallized on both sides to produce first electrodes.

The capacitors produced using the process according to the invention have operating temperatures of over 150° C.

Figure 15:
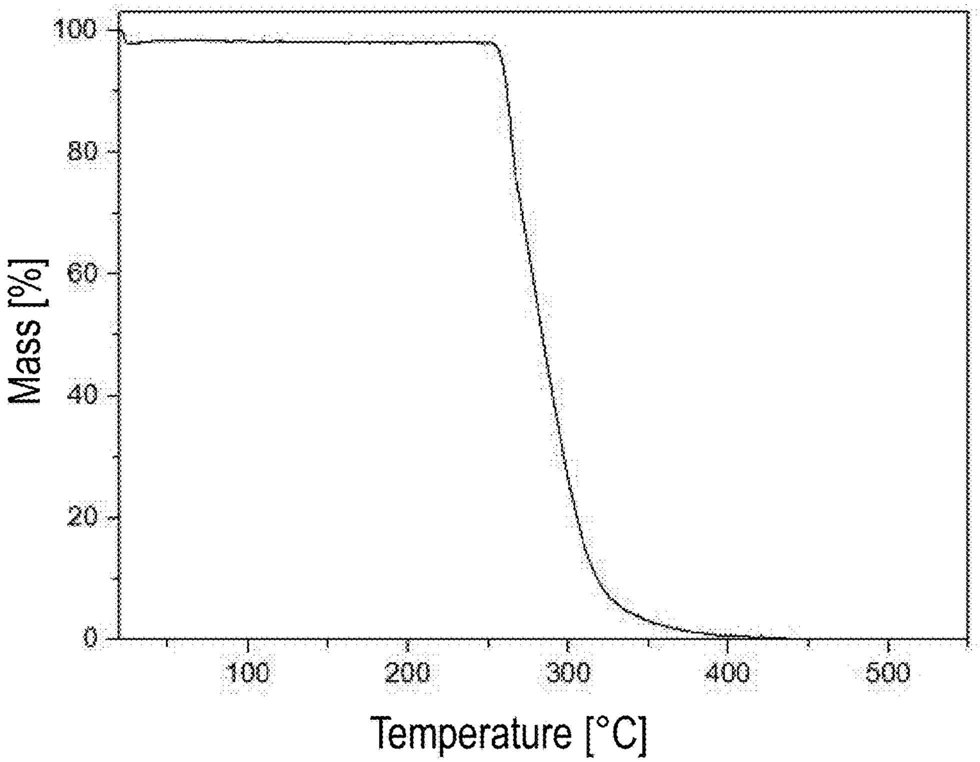
FIG. 15 shows a first thermogravimetric analysis.

FIG. 15 shows a thermogravimetric analysis of a pure poly(glycidyl methacrylate). This shows a relative and absolute degree of crosslinking of over 25%, with each repeating unit carrying exactly one reactive group. The thermogravimetric analysis was carried out in air, using a temperature increase rate of 10 Kelvin per minute. As the thermogravimetric analysis shows, there is hardly any mass loss below 240° C. A mass loss of over 5% can only be observed above 240° C. An actual steep drop in mass can also only be observed above 250° C. Accordingly, the corresponding material according to the invention is suitable for use at temperatures of 150° C. or above. It is also suitable for use in a component which is connected by soldering. The material can easily withstand the usual conditions of soldering.

Figure 16:
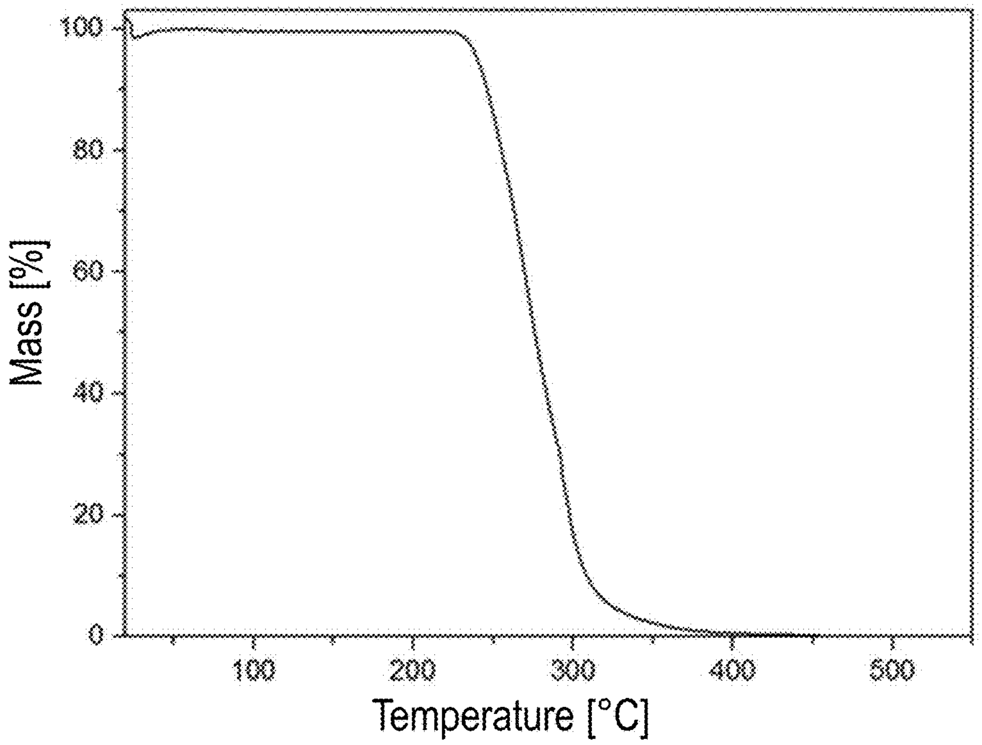
FIG. 16 shows a second thermogravimetric analysis.

FIG. 16 shows a thermogravimetric analysis of a copolymer with glycidyl methacrylate and butyl methacrylate repeating units, where the proportion of glycidyl methacrylate was 20% and the proportion of butyl methacrylate was 80%. The relative degree of crosslinking, i.e. the proportion of crosslinking gylcidyl groups, was also 25%. The other conditions corresponded to those of the thermogravimetric analysis in FIG. 15.

The copolymer shows a slightly reduced temperature stability compared to the homopolymer of FIG. 15, although it is suitable for use at temperatures above 150° C. The slightly reduced temperature stability is attributed to the fact that the absolute or mass-related degree of crosslinking was lower than for the homopolymer of FIG. 15 due to the proportion of butyl methacrylate repeat units.

However, the copolymer has the advantage that it is more resistant to moisture, as the glycidyl methacrylate content is reduced. The butyl group of the butyl methacrylate repeat units is hydrophobic and can therefore compensate for the hydroscopic or water-reactive character of the remaining glycidyl groups.

Figure 17:
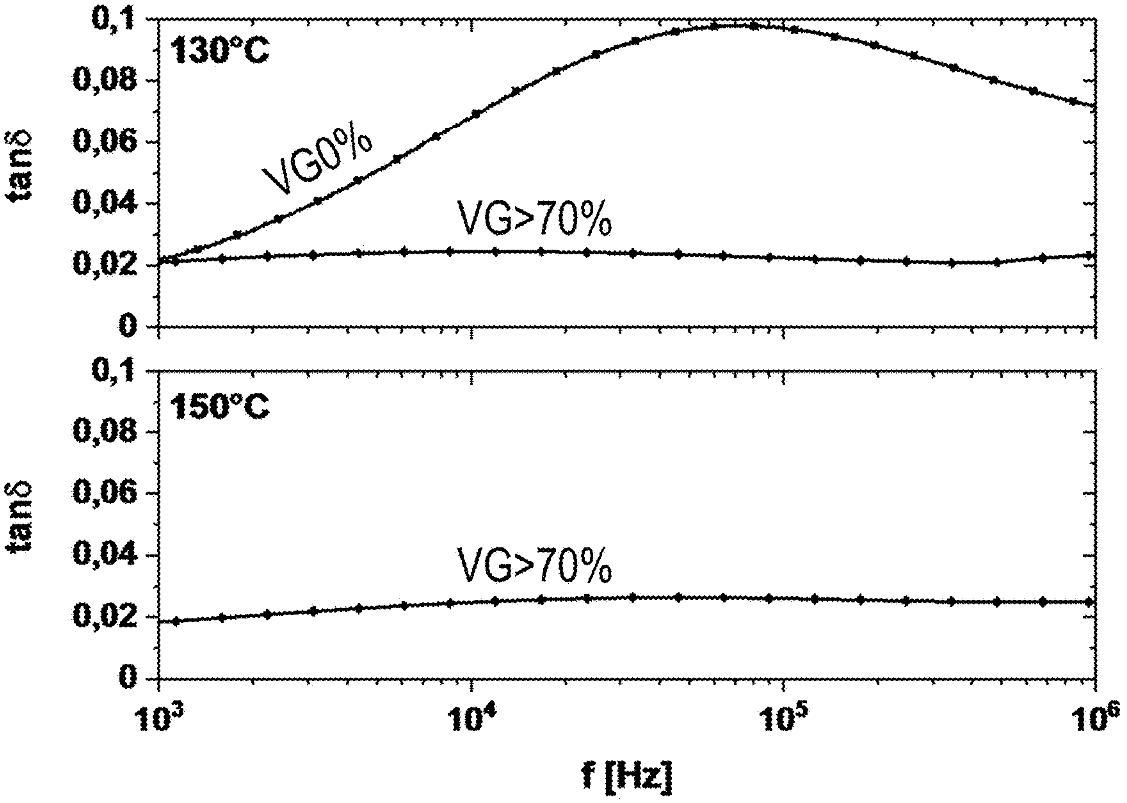
FIG. 17 shows the dependence of the loss factor on the degree of crosslinking.

FIG. 17 shows two graphs of the temperature behavior of the loss factor tan δ.

For the upper representation in FIG. 17, or the upper graph, the frequency-dependent loss factor tan δ was measured as a function of the frequency at a temperature of 130° C. For the representation at 130° C., a curve for an uncrosslinked polymer (VG0%) is shown in comparison to a curve for a polymer (VG>70%), which has a relative degree of crosslinking of over 70%. The non-crosslinked polymer (VG0%) corresponds to a polymer as used in the invention, with the exception that no crosslinking was carried out.

As can be seen, the loss factor of the non-crosslinked polymer (VG0%) at 130° C. exhibits a strong frequency dependence. In contrast, the dissipation factor of the polymer (VG>70%) with a relative degree of crosslinking of over 70% at 130° C. is almost constant at a value of 0.02 over the frequency range from $10^3$ to $10^6$ Hz.

A similar behavior can also be seen for the polymer (VG>70%) with a relative degree of crosslinking of over 70% at 150° C. For temperatures of 180° C. (not shown), a similar almost constant graph-curve is also obtained for the polymer (VG>70%) with a relative degree of crosslinking of over 70%, wherein the loss factor here is higher at approx. 0.04.

FIG. 17 shows that the degree of crosslinking can make a significant contribution to temperature stability and to reducing the loss factor.

Figure 18:
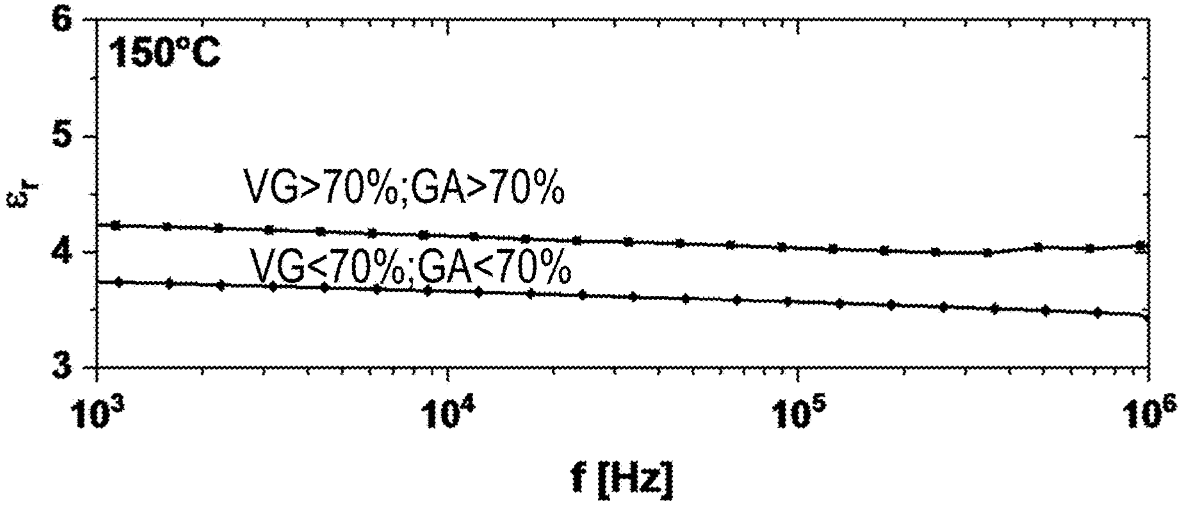
FIG. 18 shows a dependence of the permittivity on the degree of crosslinking.

FIG. 18 shows the frequency dependence of the permittivity for two dielectric layers at a temperature of 150° C. The upper curve shows the behavior of a polymer (VG>70%; GA>70%) with a relative degree of crosslinking of over 70% and a glycidyl methacrylate content of over 70%. The relative degree of crosslinking of this polymer (VG>70%; GA>70%) was 95%. The glycidyl methacrylate content was 100%. The lower curve shows the behavior of a polymer (VG<70%; GA<70%) with a relative degree of crosslinking of less than 70% and a glycidyl methacrylate content of less than 70%. The relative degree of crosslinking of this polymer (VG<70%; GA<70%) was 45%. The proportion of glycidyl methacrylate was 50%. In both cases, these are polymers according to the invention. As can be seen, the permittivity is well above 3 in both cases and is largely constant over the entire frequency range between $10^3$ and $10^6$ Hz. However, it can be observed that the higher relative degree of crosslinking and the higher glycidyl methacrylate content lead to an increased permittivity $\varepsilon_r$.

It could thus be shown that a constant permittivity of well over 3 or even over 4 can be achieved over a wide frequency range with a polymer according to the invention.

This trend can also be recognized according to the examples in Table 1.

Table 1 shows the values of the loss factor tan δ and the permittivity $\varepsilon_r$ for polymers with different compositions and relative degrees of crosslinking for different frequencies and at different temperatures. "rel. Crosslinking" refers to the relative degree of crosslinking. "Glycidyl" refers to the glycidyl methacrylate content. "Non-polar groups" refers to the proportion of repeating units containing a non-polar group.

In particular, three different compositions of a copolymer comprising a polyacrylate with glycidyl groups and non-polar groups in different compositions are shown in Table 1. It can be seen here that all of these molecules exhibit both an advantageous loss factor and an advantageous permittivity over a wide frequency range. However, it is noticeable that the permittivity is greatest for particularly highly crosslinked systems, whereas the loss factor or the constancy of the loss factor may be improved for lower crosslinked systems.

TABLE 1

| | Frequency | | | | | | | | |
|---|---|---|---|---|---|---|---|---|---|
| | 1 kHz | | 10 kHz | | 100 kHz | | 1 MHz | | Polymer (rel. degree of cross-linking/ proportion of repeating units with |
| Temp. | tanδ | $\varepsilon_r$ | tanδ | $\varepsilon_r$ | tanδ | $\varepsilon_r$ | tanδ | $\varepsilon_r$ | certain functional groups) |
| 30° C. | 0.016 | 5.0 | 0.018 | 5.0 | 0.028 | 4.7 | 0.030 | 4.5 | rel. crosslinking >90%, Glycidyl >70%, |
| 150° C. | 0.018 | 4.2 | 0.025 | 4.1 | 0.026 | 4.0 | 0.025 | 4.0 | non-polar groups <10% |
| 30° C. | 0.011 | 3.8 | 0.013 | 3.7 | 0.019 | 3.7 | 0.025 | 3.5 | rel. crosslinking <70%, Glycidyl <70%, |
| 150° C. | 0.014 | 3.7 | 0.017 | 3.7 | 0.019 | 3.6 | 0.021 | 3.4 | non-polar groups <50% |
| 30° C. | 0.010 | 3.5 | 0.011 | 3.5 | 0.014 | 3.4 | 0.015 | 3.3 | rel. crosslinking <70%, Glycidyl <60%, |
| 150° C. | 0.016 | 3.6 | 0.018 | 3.5 | 0.019 | 3.4 | 0.018 | 3.3 | non-polar groups >40% |

Thus, within the scope of the present invention, a material can be tailor-made which, according to the technically relevant specifications, either has a particularly good dielectric constant of values up to almost 5 or, alternatively, is a material that is as constant as possible with regard to the loss factor. It should be noted here that the corresponding other properties remain satisfactory even in the extreme cases.

Figure 19:
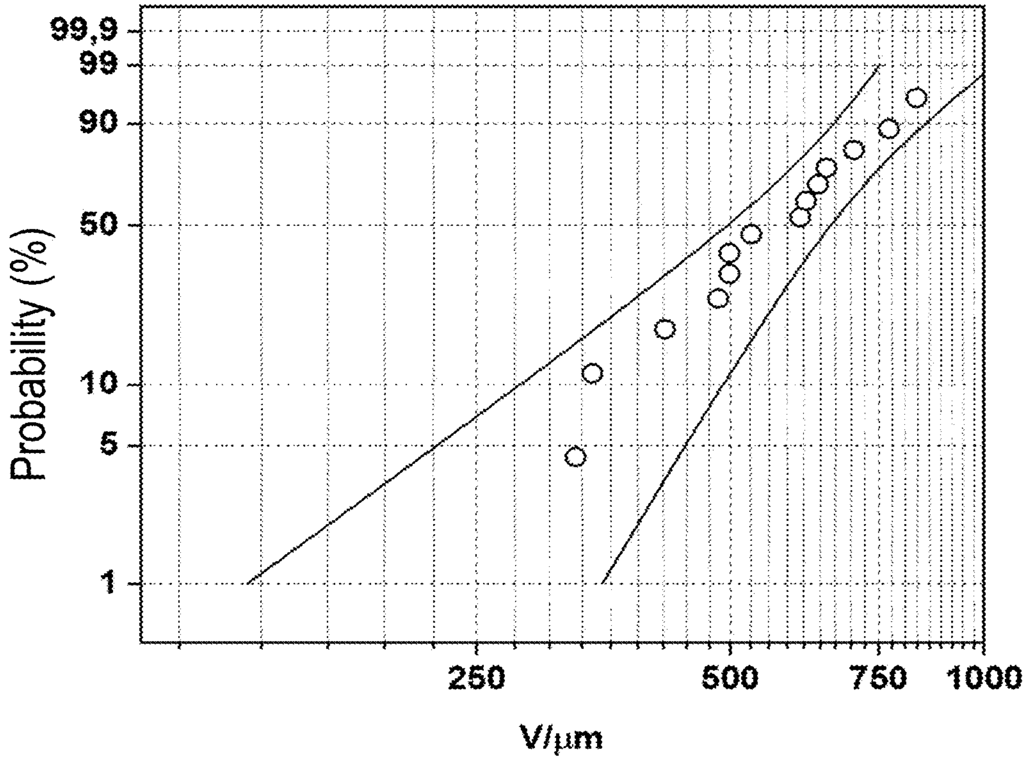
FIG. 19 shows a breakdown voltage distribution for a system according to the invention

FIG. 19 shows a statistical evaluation of the breakdown voltage for a system with a glycidyl methacrylate content of 50% and a relative degree of crosslinking of 95%. The other monomers have non-polar groups. The measurements were carried out on a metal foil coated with a dielectric layer of approx. 3 μm thickness. The metal foil served as the first electrode. A second electrode was prepared by sputtering. The measurement was carried out with a voltage ramp of 20 kV per minute and a maximum current of approx. 10 mA. It was shown that a voltage breakdown can only be achieved well above 250 V. Furthermore, a breakdown voltage stability of 500 V can be achieved for the majority of the tests.

Figure 20:
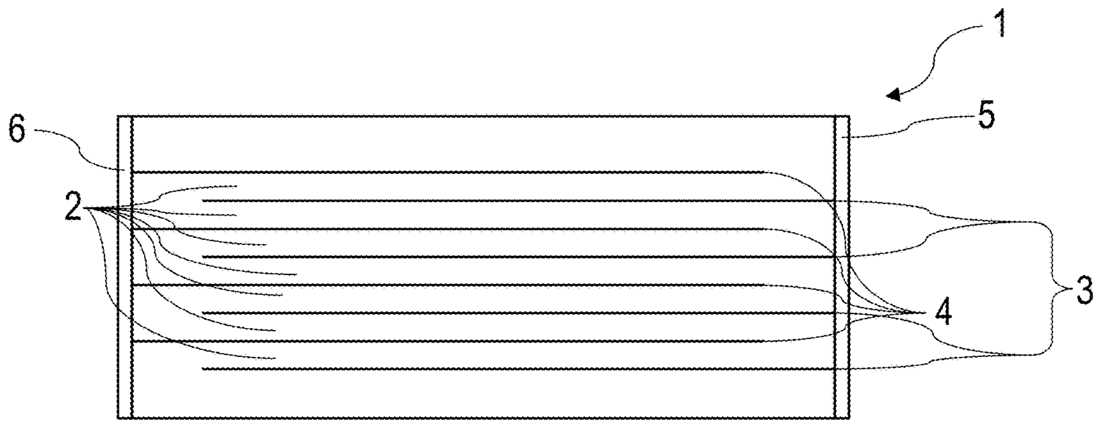
FIG. 20 shows a first example of a multilayer capacitor.

FIG. 20 shows a schematic cross-section of a first exemplary embodiment of a multilayer capacitor 1. The multilayer capacitor 1 has a plurality of electrodes 3, which are alternately stacked with electrodes 4. Both electrodes are flat electrodes. A dielectric layer 2, which conceptually corresponds to the dielectric layer 2 from the exemplary embodiment of the simple capacitor shown in FIG. 1, is arranged between the first electrodes 3 and the second electrodes 4, i.e. between two adjacent electrodes in each case.

The first electrodes 3 and the second electrodes 4 have the character of internal electrodes. First external contacts 5 and second external contacts 6 are arranged on opposite side surfaces of the multilayer capacitor, wherein the first external contacts conductively connect the first electrodes 3. The second external contacts conductively connect the second electrodes 4.

The capacitor formed in this way can be a surface-mounted device (SMD), which is very suitable for soldering due to its temperature-stable dielectric layer 2.

In order to be able to use the multilayer capacitor 1 even more advantageously as an SMD component, the external contacts 5 and 6 can have a clamp-shaped structure (not shown). Accordingly, the external contacts 5 and 6 can extend a little way along a stacking direction on the side surfaces used as the top or bottom in a structure.

The capacitor 1 can, for example, be cuboidal and consist of a total of 1000 repeating units. The repeating units of the multilayer capacitor are not to be confused with the repeating units of a polymer chains. The number of repeating units can also be higher. The repeating units consist of a first electrode 3, a dielectric layer 2, an optional second electrode 4 and a further dielectric layer 2. The capacitor 1 can have a length of 3 to 4 mm, a width of 2 to 3 mm and a height of 1 to 2 mm. The individual dielectric layer can have a thickness of 500 nm to 5 μm. The preferred thickness is between 500 nm and 2 μm. The inner electrodes can have a thickness of 10 to 50 nm and preferably a thickness of 20 nm.

Figure 21:
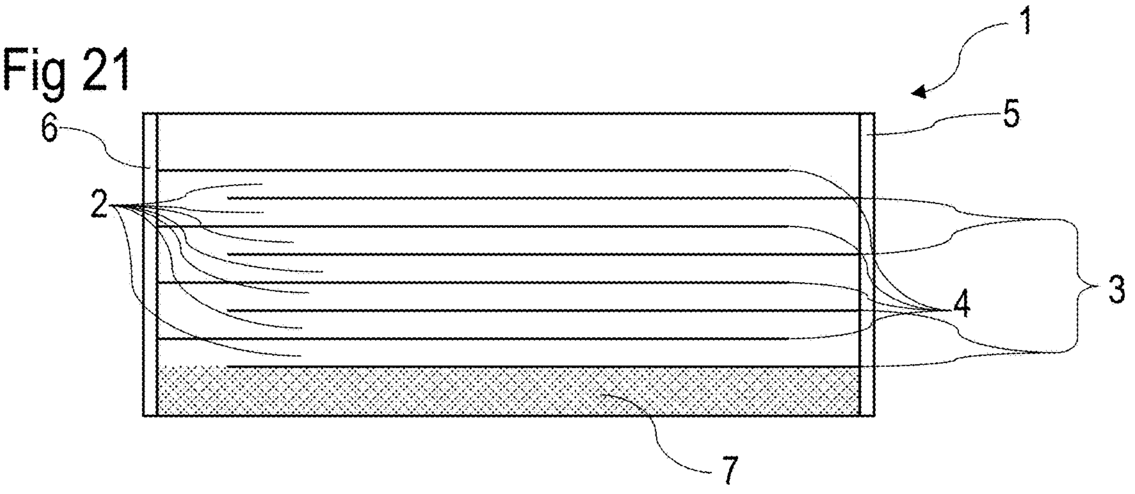
FIG. 21 shows a second example of a multilayer capacitor.

FIG. 21 shows a second exemplary embodiment of a multilayer capacitor. The capacitor in FIG. 21 corresponds in large parts to the capacitor as shown in FIG. 20 and described above. In the example shown in FIG. 21, however, the original substrate used in the process, which is labeled here as substrate 7, is still present on the component. For the example shown in FIG. 21, the substrate 7 is insulating. It can be, for example, a glass substrate, a semiconductor wafer or a flexible substrate such as polyimide films or a release tape.

Figure 22:
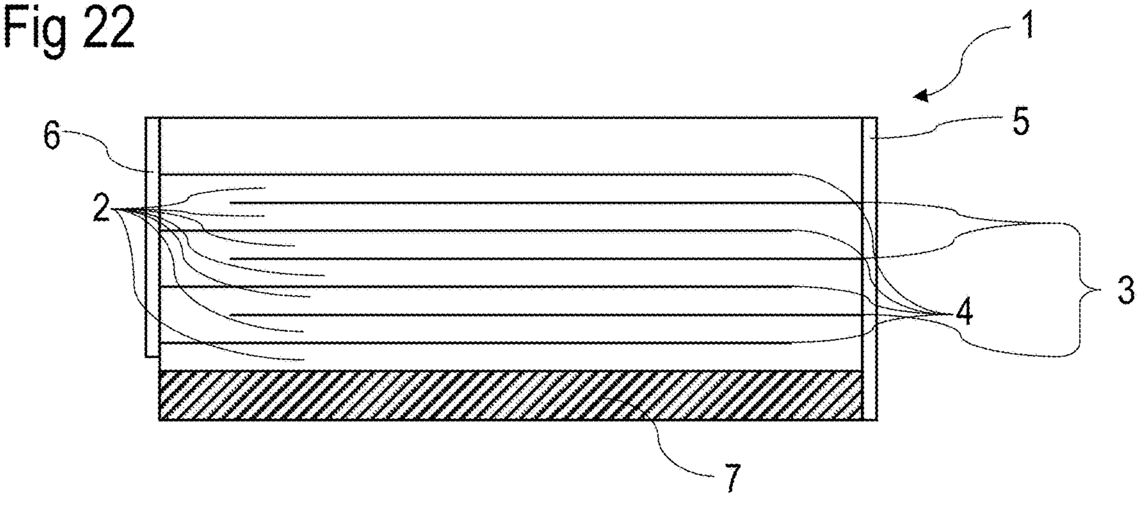
FIG. 22 shows a third example of a multilayer capacitor.

FIG. 22 shows a schematic cross-section of a third exemplary embodiment of a multilayer capacitor 1. The exemplary embodiment shown in FIG. 22 is very similar to the example shown in FIG. 21. However, here the substrate 7 is a metallic, conductive substrate, for example made of aluminum, copper or similar materials. It is present here, for example, as a foil. Due to its conductive nature, it is not necessary to apply a conductive layer as the first electrode 3 on the substrate. The substrate itself can serve as a replacement for one of the first electrodes 3. A dielectric layer can be applied directly to the substrate or to the substrate as a replacement electrode. A method described above can be adapted accordingly. It should be noted here that, since the substrate preferably extends over the entire width and length of the capacitor, care must be taken to ensure that the second external contact 5 does not come into electrical contact with the substrate 7.

Figure 23:
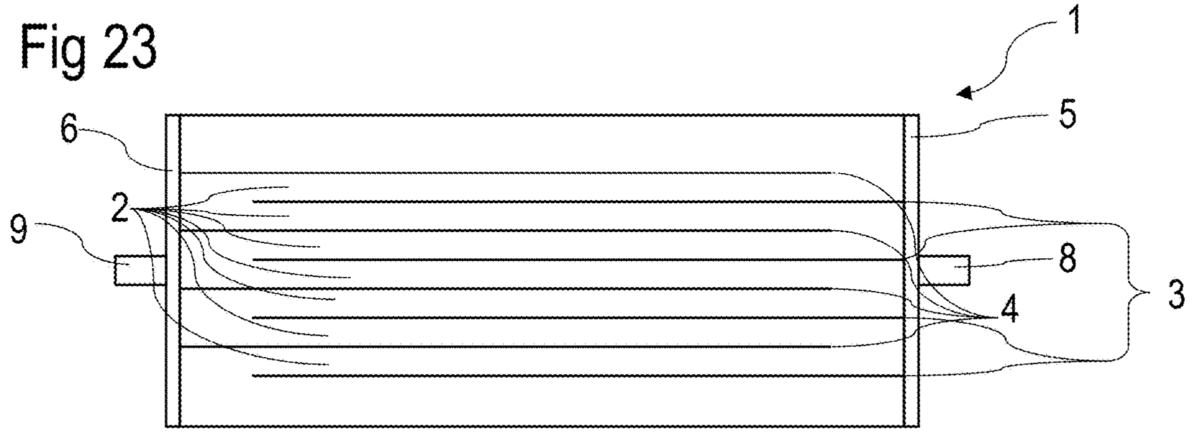
FIG. 23 shows a fourth example of a multilayer capacitor.

FIG. 23 shows a fifth example of a multilayer capacitor 1. This corresponds to the example shown in FIG. 20, but also has wires 8 and 9 on the external contacts 5 and 6 respectively, which enables through-hole mounting on a circuit board or in an application. The capacitor shown in FIG. 23 is therefore a through-hole capacitor. The wires 8 and 9 create an electrical and preferably also a mechanical contact with connection points in an application. The wires 8 and 9 can be attached to the capacitor 1 or to the external contacts 5 and 6 by any method, such as bonding.

Figure 24:
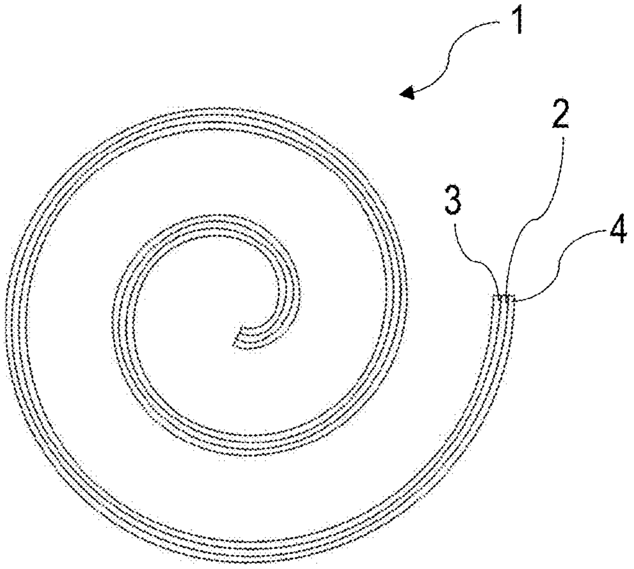
FIG. 24 shows a schematic representation of a wound capacitor in cross-section.

FIG. 24 shows a schematic cross-section of an example of a wound capacitor 1. In its basic structure, the wound capacitor is similar to the first example shown in FIG. 1. A dielectric layer 2 is sandwiched by a first electrode 3 and a second electrode 4. The correspondingly comparatively thin and flat sandwich-like structure is rolled up to form a wound capacitor. Preferred layer thicknesses for wound capacitors with a dielectric layer according to the invention are in the range between 1 μm and 10 μm. Preferred layer thicknesses are between 2 μm and 5 μm.

LIST OF REFERENCE SYMBOLS

1 capacitor
2 dielectric layer
3 first electrode
4 second electrode
5 first external contact
6 second external contact
7 substrate
8 first wire
9 second wire

The invention claimed is:

1. A capacitor, having a first electrode and a second electrode, both the first electrode and the second electrode are directly attached to a dielectric layer, the dielectric layer having a polymer material in which polymer main chains or different sections of a polymer main chain are covalently linked to one another via bridging linker molecules.

2. The capacitor according to claim 1, wherein a proportion of repeating units to which a linker molecule is covalently bonded is between 5% and 99%.

3. The capacitor according to claim 1, wherein the polymer main chains contain acrylate repeating units and wherein functional groups which are covalently bonded to a linker molecule or are suitable for such a bond are attached via a carboxylate group of the respective acrylate repeating unit in the form of an ester bond.

4. The capacitor according to claim 1, wherein a proportion of repeating units which are covalently linked to a linker molecule via a functional group is between 25% and 99% relative to the sum of these repeating units and the repeating units with a functional group which is suitable for covalent linkage to a linker molecule.

5. The capacitor according to claim 1, wherein the covalent link is selected from an ether bridge, an ester bridge, an amine bridge, an amide bridge and a thioether bridge.

6. The capacitor according to claim 1, wherein also the second electrode is arranged on another side of the dielectric layer.

7. The capacitor according to claim 1, wherein the covalently linking in the dielectric layer allows for use of the capacitor at operating temperatures of 150° C. or above.

8. The capacitor according to claim 1, wherein the polymer main chains comprise glycidyl methacrylate as repeating units as homo- or copolymers.

9. A multilayer capacitor comprising:

electrodes; and dielectric layers alternatingly stacked with the electrodes, the dielectric layers having a polymer material in which polymer main chains or different sections of a polymer main chain are covalently linked to one another via bridging linker molecules, and wherein the electrodes are contacted via external contacts.

10. A wound capacitor comprising:

a dielectric layer;

a first electrode arranged on one side of the dielectric layer; and a second electrode arranged on an opposite side of the dielectric layer, wherein the dielectric layer and the first and second electrodes are wound into a capacitor roll, and in the dielectric layer, polymer main chains or different sections of a polymer main chain are covalently linked to one another via bridging linker molecules.

* * * * *